United States Patent [19]
Berman

[11] Patent Number: 5,845,124
[45] Date of Patent: Dec. 1, 1998

[54] SYSTEMS AND METHODS FOR GENERATING AND DISPLAYING A SYMBOLIC REPRESENTATION OF A NETWORK MODEL

[75] Inventor: Jeremy S. Berman, St. Louis Park, Minn.

[73] Assignee: NCR Corporation, Dayton, Ohio

[21] Appl. No.: 641,599

[22] Filed: May 1, 1996

[51] Int. Cl.⁶ ............................. G06F 11/30; G06F 17/50
[52] U.S. Cl. ..................... 395/500; 395/200.53; 707/103
[58] Field of Search ................. 395/500, 200.53, 395/200.54, 200.71, 200.72; 345/40, 473; 707/103, 104

[56] References Cited

U.S. PATENT DOCUMENTS

| | | | |
|---|---|---|---|
| 5,414,812 | 5/1995 | Filip et al. | 707/103 |
| 5,485,600 | 1/1996 | Joseph et al. | 395/500 |
| 5,504,992 | 4/1996 | Den et al. | 395/200.53 |
| 5,604,892 | 2/1997 | Nuttall et al. | 707/104 |

*Primary Examiner*—Kevin J. Teska
*Assistant Examiner*—Tyrone V. Walker
*Attorney, Agent, or Firm*—William A. Munck

[57] ABSTRACT

The present invention is directed, in general, to network modeling, and more specifically, to systems and methods for generating and displaying a symbolic representation of a network model. The present invention provides a method of graphically displaying data on a display device of a processing system and a computer system employing the method. The processing system includes a memory for storing tasks, a processing circuit for executing ones of the tasks, and a display device. The display device, which is associated with the processing circuit, is operative to provide a display area that is accessible to executed ones of the tasks. The display area is capable of displaying a symbolic representation of a network model. The memory includes a network modeling task that is retrievable and executable by the processing circuit to create a set of associated data records representing network elements within the network model. The associated data records include multiplicity indicia for providing an abbreviated expression of quantities of the network elements within the network model. The multiplicity indicia simplifying the modeling task and facilitating the display of a symbolic representation of the network model on the display device.

22 Claims, 14 Drawing Sheets

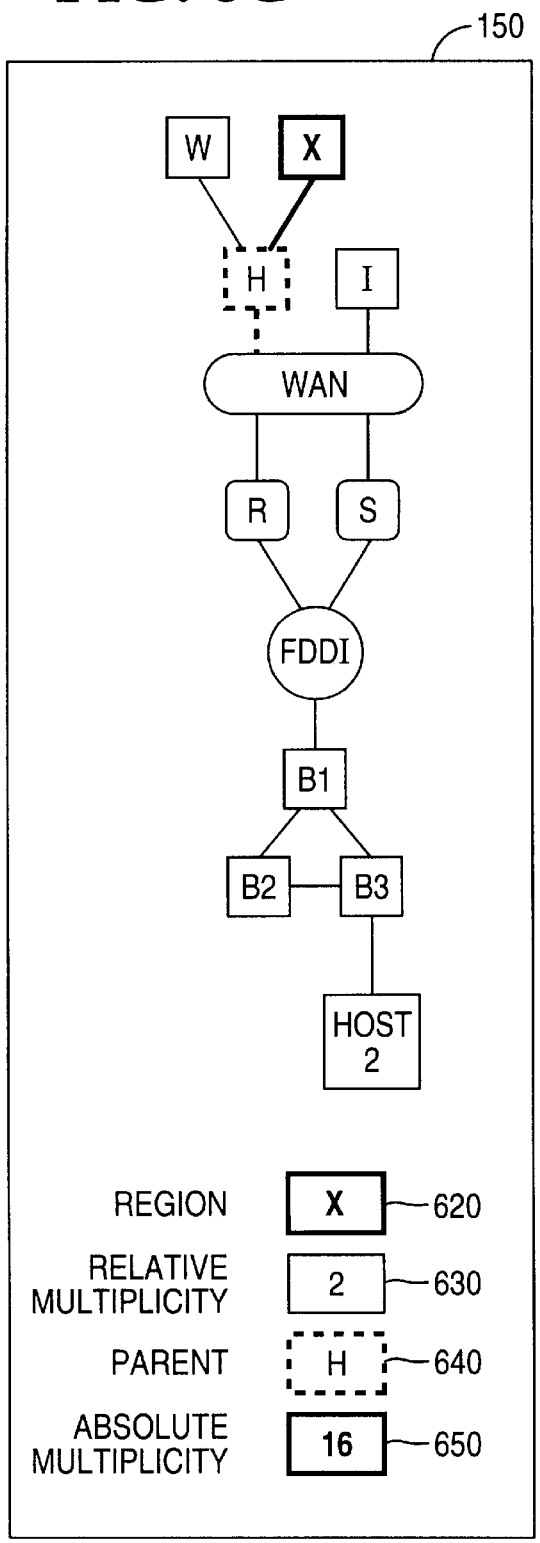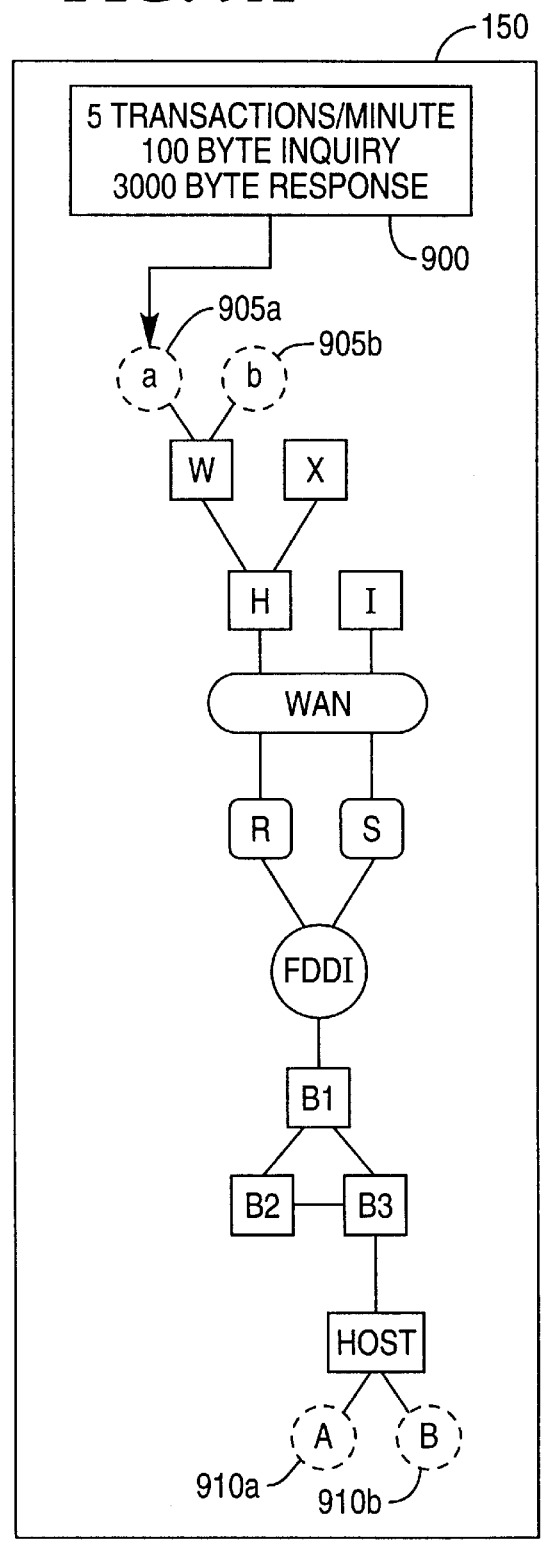

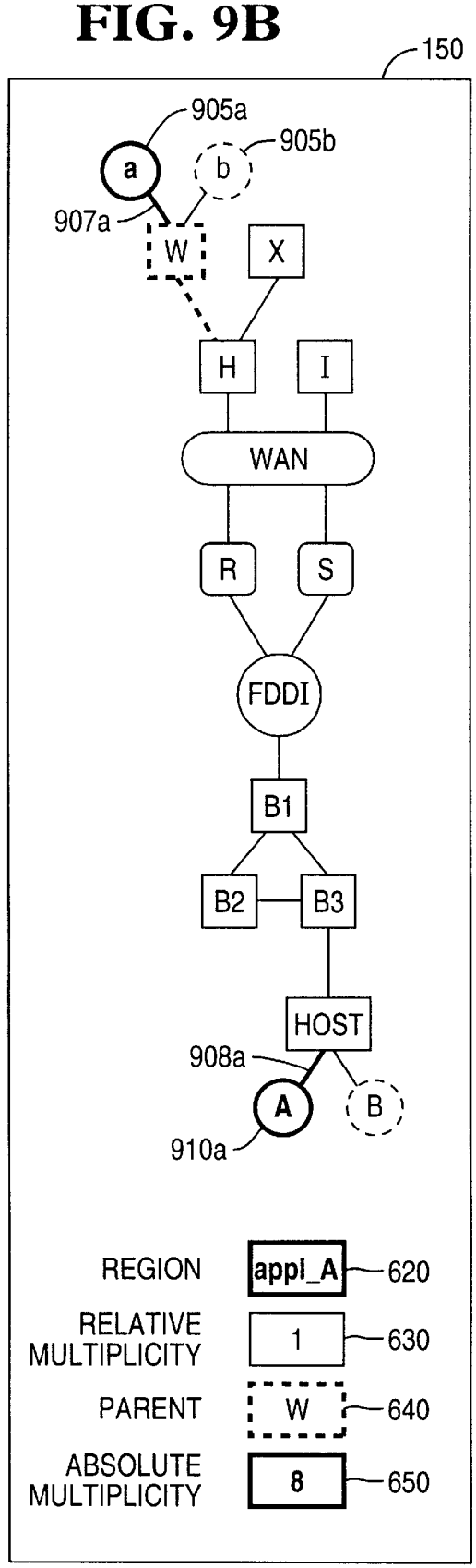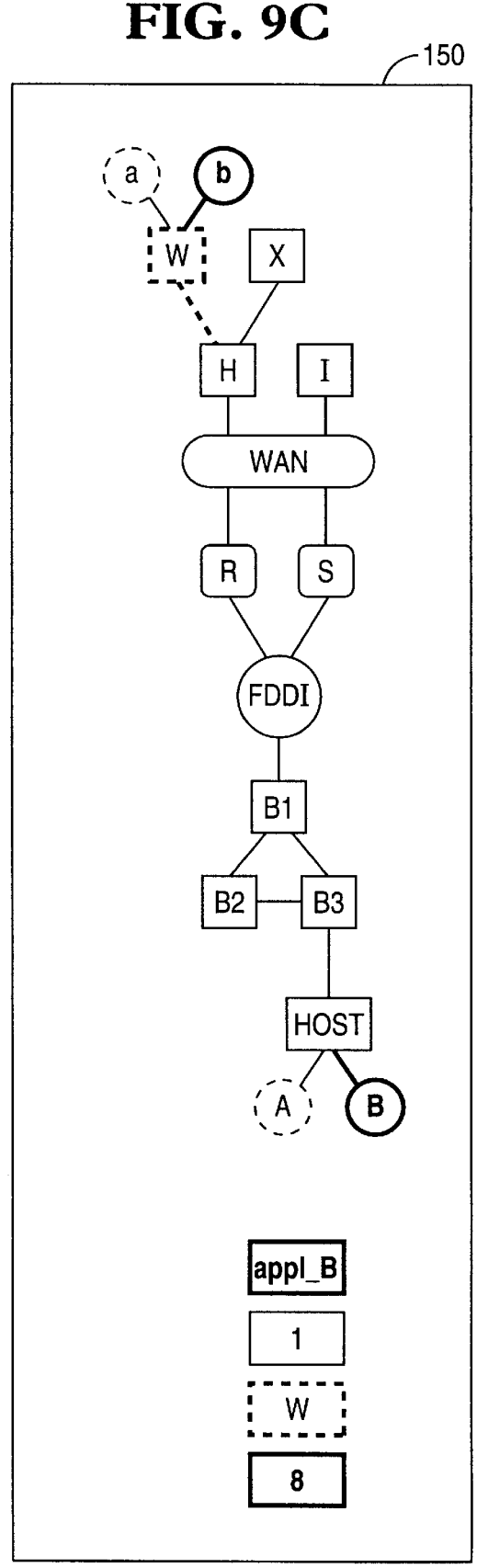
FIG. 9B
FIG. 9C

SYSTEMS AND METHODS FOR GENERATING AND DISPLAYING A SYMBOLIC REPRESENTATION OF A NETWORK MODEL

TECHNICAL FIELD OF THE INVENTION

The present invention is directed, in general, to network modeling and, more specifically, to systems and methods for generating and displaying a symbolic representation of a network model.

BACKGROUND OF THE INVENTION

Modern day networks are extremely complex. They are often distributed over great distances and typically consist of many, possibly even thousands of, nodes. For network modeling purpose, the configurations may often be adequately described in but a few phrases or sentences. For example, a wide area network ("WAN") used by a convenience store chain of 100 stores may suitably be described as including a processing hub in each store, each hub connected via the WAN to a processing center and having fifty attached workstations; wherein each of the workstations accesses a common application program and is operative to send in 100-byte requests and receive back 1000 byte responses. Such a description shows that there are actually only a small number of network elements to be described, although there may exist a large multiplicity of some of these elements (e.g., instances, plurality, multitude, multiformity, several, etc.).

Conventional network modeling tools fail to exploit the simplicity of the above description. In point of fact, conventional network modeling tools have very limited capacity to reduce the drawing complexity. They require one to draw all 100 hubs, and report on hub utilizations only one at a time. For many network modeling tools, the same is true for the 5000 work stations as well.

An important use of network modeling tools is to design and tailor a network to a user's particular needs. The model should explore many possible combinations of link speeds, router capacities, message rates, links and router quantities, or the like, in a search for a "best fit" to a user's needs. A fast and efficient means of modeling the network, and a concise report on the performance of the network is mandatory for this exploratory mode. Unfortunately, conventional modeling techniques used in network modeling tools are too cumbersome to accomplish the foregoing.

Most presently available network modeling tools suffer from a common ailment, specifically, they fail to recognize network symmetries and network element groupings associated with a network. The occurrence and recognition of these typical symmetries and common groupings may suitably reduce the network description necessary for a complete network model, thereby improving the power and efficiency of the network modeling tool.

Accordingly, there exists a need in the art for a network modeling tool that recognizes symmetries and common groupings of network elements in a proposed network and uses the same to provide a simplified representation of the network.

There exists a further need in the art for a network modeling tool that easily modifies, or reconfigures, a network model without substantially redefining the entire representation of the network.

There exists a still further need in the art for a network modeling tool that provides a concise report on the performance of the network, as well as particular network elements and common groups of network elements within the network.

SUMMARY OF THE INVENTION

To overcome the above-detailed disadvantages and shortcomings of the prior art, it is an object of the present invention to provide, in a graphical user interface ("GUI") environment, a means by which a user may simplify the generation and display of a symbolic representation of a network model on a display device. In the attainment of the same, the present invention provides a method of generating and displaying a symbolic representation of a network model on a display device of a computer system, a computer system employing the method, and a method for representing a network model in a memory.

The method of generating and displaying the symbolic representation of the network model comprises the steps of: (1) providing a display area on the display device that is capable of displaying the symbolic representation of the network model, and (2) creating a set of associated data records representing network elements within the network model, the associated data records including multiplicity indicia for providing an abbreviated expression of quantities of the network elements within the network model. The multiplicity indicia are used to simplify the generation and display of the symbolic representation of the network model on the display device.

In alternate embodiments of the present method, the method may include at least one of the following steps: (1) displaying the symbolic representation of the network model in the display area or (2) displaying the multiplicity indicia in the display area. In another alternate embodiment, the method includes the steps of receiving a modification signal and, in response thereto, modifying the set of associated data records. In a further alternate embodiment, the method includes the step of creating a root data record that represents a root node within the network model. In a still further alternate embodiment, the method includes the step of processing the set of associated data records, using at least one of a mathematical network model or a simulation network model, to predict actual network performance. This step may further include the step of generating a performance report in response to the mathematical or simulation modeling step.

The processing system for generating and displaying the symbolic representation of the network model comprises: (1) a memory for storing tasks, (2) a processing circuit, associated with the memory, for executing ones of the tasks, (3) a display device, associated with the processing circuit, for providing a display area, accessible to executed ones of the tasks, capable of displaying a symbolic representation of the network model, and (4) a network modeling task storable in the memory and executable by the processing circuit to create a set of associated data records representing network elements within the network model. The associated data records include multiplicity indicia for providing an abbreviated expression of quantities of the network elements within the network model. The multiplicity indicia simplifies the generation and display of the symbolic representation of the network model on the display device.

In alternate embodiments, the network modeling task directs the processing circuit to access the display area and to display the symbolic representation of the network model therein. In another alternate embodiment, the network modeling task directs the processing circuit to display the multiplicity indicia. In a further alternate embodiment, the processing system includes a user interface, that is associated with the processing circuit, which may suitably direct the processing circuit to modify the set of associated data records in response to signals received from the same. In a still further alternate embodiment, the network modeling task directs the processing circuit to create a root data record that represents a root node within the network model. In another alternate embodiment, the network modeling task directs the processing circuit to process the set of associated data records, using at least one of a mathematical network model or a simulation network model, to predict actual network performance. The network modeling task may further direct the processing circuit to generate a performance report in response to the processing of the set of associated data records.

The method for representing the communications network model in the memory comprises the steps of: (1) receiving a set of characteristics associated with network elements within the network model, the set of characteristics including multiplicity indicia for providing an abbreviated expression of quantities of the network elements within the network model and (2) creating a set of associated data records in the memory using the multiplicity indicia, the set of associated data records representing the network elements and incorporating the set of characteristics. The multiplicity indicia is used to simplify the representation of the network model in the memory.

In alternate embodiments of the present method, the method may suitably include the step of receiving a user input for modifying the set of associated data records. In another alternate embodiment, the method may further include the step of associating a network element indicator with the associated data records that may suitably be used to identify each of the network elements as one of a node, a gateway, a router, a bridge, a local area network ("LAN"), a link, or the like. In further alternate embodiments, the method may include the step of creating a root data record representing a root node within the network model. In a still further alternate embodiment, the method may further include the step of processing the set of associated data records using at least one of a mathematical network model or a simulation network model.

An important aspect of the present invention is that it may suitably be implemented in hardware, firmware or software. An exemplary software embodiment, for example, includes a plurality of instructions stored to a conventional storage medium. The instructions are readable and executable by a processing circuit. The instructions, upon execution, operate to direct the processing circuit to store a network model in accordance with the principles of the present invention, or display the same to a suitable display device. Preferred storage media include, without limitation, magnetic, optical and semiconductor, as well as suitable combinations thereof.

The foregoing has outlined rather broadly a number of features and technical advantages of the present invention so that those skilled in the art may better understand the Detailed Description of the Invention that follows. Additional features and advantages of the present invention will be described hereinafter that, in conjunction with the foregoing, form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the present invention in its broadest form.

BRIEF DESCRIPTION OF THE DRAWINGS

For a more complete understanding of the present invention and the advantages thereof, reference is now made to the following descriptions taken in conjunction with the accompanying drawings in which like numbers designate like parts, and in which:

FIGS. 8a, 8b, 8c, 8d, 8e, 8f and 8g illustrate further exemplary symbolic representations of the exemplary network of FIG. 3 further exhibiting exemplary definitions of other regions;

FIG. 9A–9C illustrates an exemplary symbolic representation of the exemplary network of FIG. 3 further exhibiting an exemplary definition of attributes associated with exemplary workstation and host node sessions;

DETAILED DESCRIPTION

Figure 1:
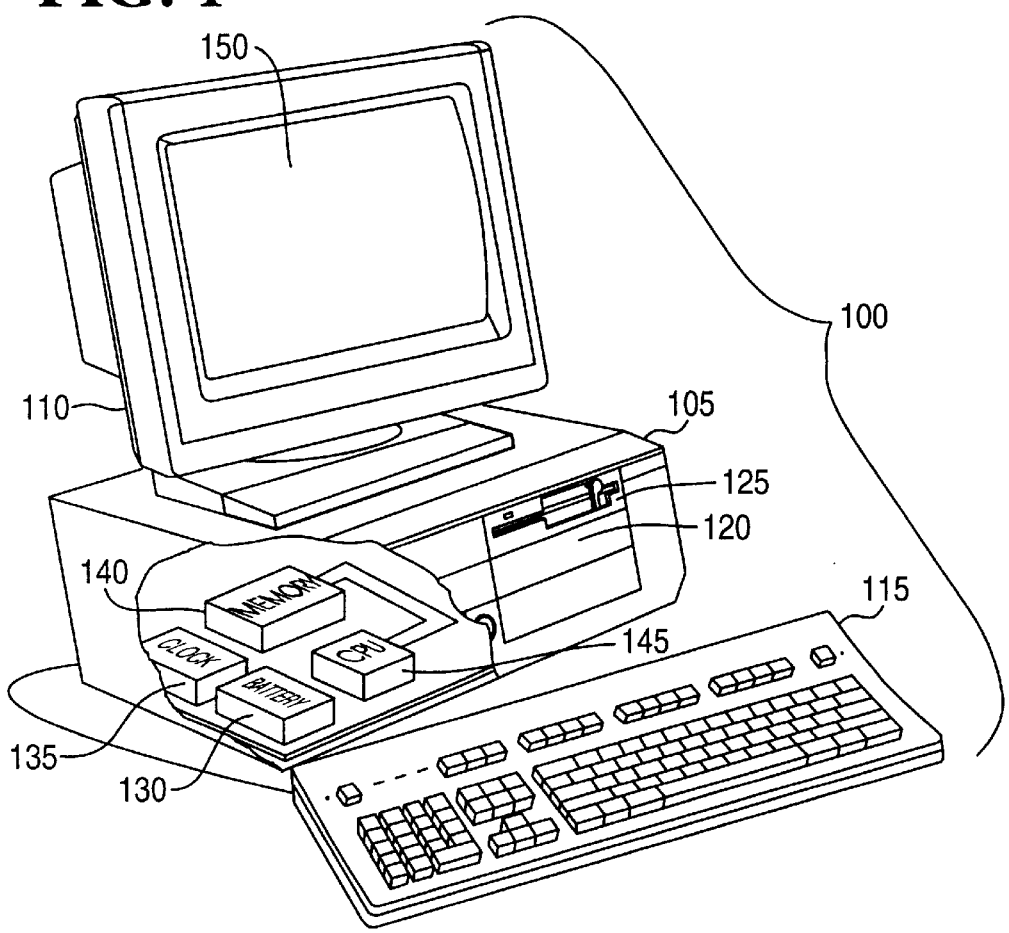
FIG. 1 illustrates an isometric view of an exemplary processing system.

FIG. 1 illustrates an isometric view of an exemplary processing system 100. Processing system 100 is capable of being programmed in accordance with the principles of the present invention. Exemplary processing system 100 includes a housing 105, a display device 110 and a keyboard 115. "Include," as the term is used herein, means to include without limitation. Housing 105 includes a hard disk drive 120 and a floppy disk drive 125. Hard disk drive 120 is suitable to provide fast access storage and retrieval. Floppy disk drive 125 is suitable to receive, read or write to external disks, and may be replaced by or combined with other conventional structures for transferring data or instructions, including tape and compact disc drives, telephony systems and devices (including telephone, video phone, facsimile or the like), network communication ports and the like. "Or," as the term is used herein, means and/or.

Housing 105 is partially cut-away to illustrate a battery 130, a clock 135, a detached local memory 140 and a processor 145, all of which are suitably housed therein. Detached local memory 140 is operative to store data and tasks. Processor 145, which is associated with detached local memory 140, is operative to execute selected ones of the tasks.

In an exemplary embodiment, display device 110, which is associated with processor 145, is operative to provide a display area 150 that is accessible to executed ones of the plurality of tasks. Display area 150 is capable of displaying a symbolic representation of a network model in accordance with the principles of the present invention. Hard disk drive 120 or detached local memory 140, either separately or collectively, store a network modeling task. The network modeling task is retrievable and executable by processor 145 to create a set of associated data records that represent a plurality of network elements within the network model. The associated data records include multiplicity indicia for providing an abbreviated expression of quantities of the network elements within the network model. "Multiplicity," as the term is used herein, includes to be various, manifold, multitude and the like. "Indicia," as the term is used herein, includes indicators, manifests, evidence, identifier or the like. The multiplicity indicia is used to simplify the display of the symbolic representation of the network model in display area 150 on display device 110. The associated data records preferably include a set of network element characteristics (e.g., capacity parameters, operating parameters, etc.), a set of network characteristics (e.g., capacity parameters, operating parameters, etc.), or the like.

Although processing system 100 is illustrated having a single processor, a single hard disk drive and a single local memory, processing system 100 may suitably be equipped with any multitude or combination of processors or storage devices. Processing system 100 may, in point of fact, be replaced by, or combined with, any suitable processing system operative in accordance with the principles of the present invention, including sophisticated calculators, and hand-held, laptop/notebook, mini, mainframe and super computers, as well as processing system network combinations of the same.

Exemplary keyboard 115 may suitably provide a user interface. Keyboard 115, which is associated with processor 145, is operative to generate control signals that are usable for controlling the aforementioned network modeling task. Although keyboard 115 is provided, any suitably arranged apparatus or device for receiving user input and generating control signals in response thereto may replace, or be used in conjunction with, keyboard 115.

Conventional processing system architecture is more fully discussed in *Computer Organization and Architecture*, by William Stallings, MacMillan Publishing Co. (3rd ed. 1993); conventional processing system network design is more fully discussed in *Data Network Design*, by Darren L. Spohn, McGraw-Hill, Inc. (1993); and conventional data communications is more fully discussed in *Data Communications Principles*, by R. D. Gitlin, J. F. Hayes and S. B. Weinstein, Plenum Press (1992) and in *The Irwin Handbook of Telecommunications*, by James Harry Green, Irwin Professional Publishing (2nd ed. 1992). Each of the foregoing publications is incorporated herein by reference.

Figure 2:
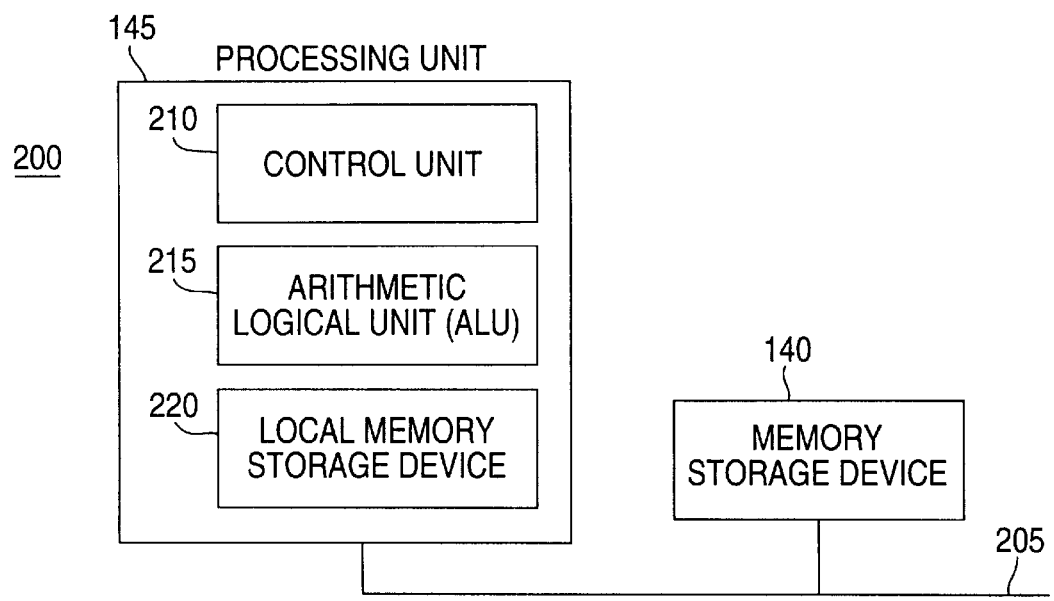
FIG. 2 illustrates a block diagram of an exemplary microprocessing circuit that may suitably be implemented in the processing system of FIG. 1.

FIG. 2 illustrates a block diagram of an exemplary microprocessing circuit 200 that may suitably be implemented in processing system 100 of FIG. 1. Microprocessing circuit 200 includes detached local memory 140 coupled via data bus 205 to processor 145. Memory 140 is operative to store data or instructions, which processor 145 is operative to retrieve and execute. Processor 145 includes a control unit 210, an arithmetic and logic unit ("ALU") 215, and a internal memory 220 (e.g., stackable cache, a plurality of registers, etc.). Control unit 210 is suitably operative to fetch ones of the instructions from memory 140. ALU 215 is suitably operative to perform a plurality of operations, such as addition and Boolean AND, needed to carry out those instructions. Internal memory 220 is suitably operative to provide local high speed storage used to store temporary results and control information.

In alternate preferred embodiments, the above-identified processor, and in particular microprocessing circuit 200, may be replaced by or combined with any other suitable processing circuits, including programmable logic devices, such as PALs (programmable array logic) and PLAs (programmable logic arrays), DSPs (digital signal processors), FPGAs (field programmable gate arrays), ASICs (application specific integrated circuits), VLSIs (very large scale integrated circuits) or the like.

Figure 3:
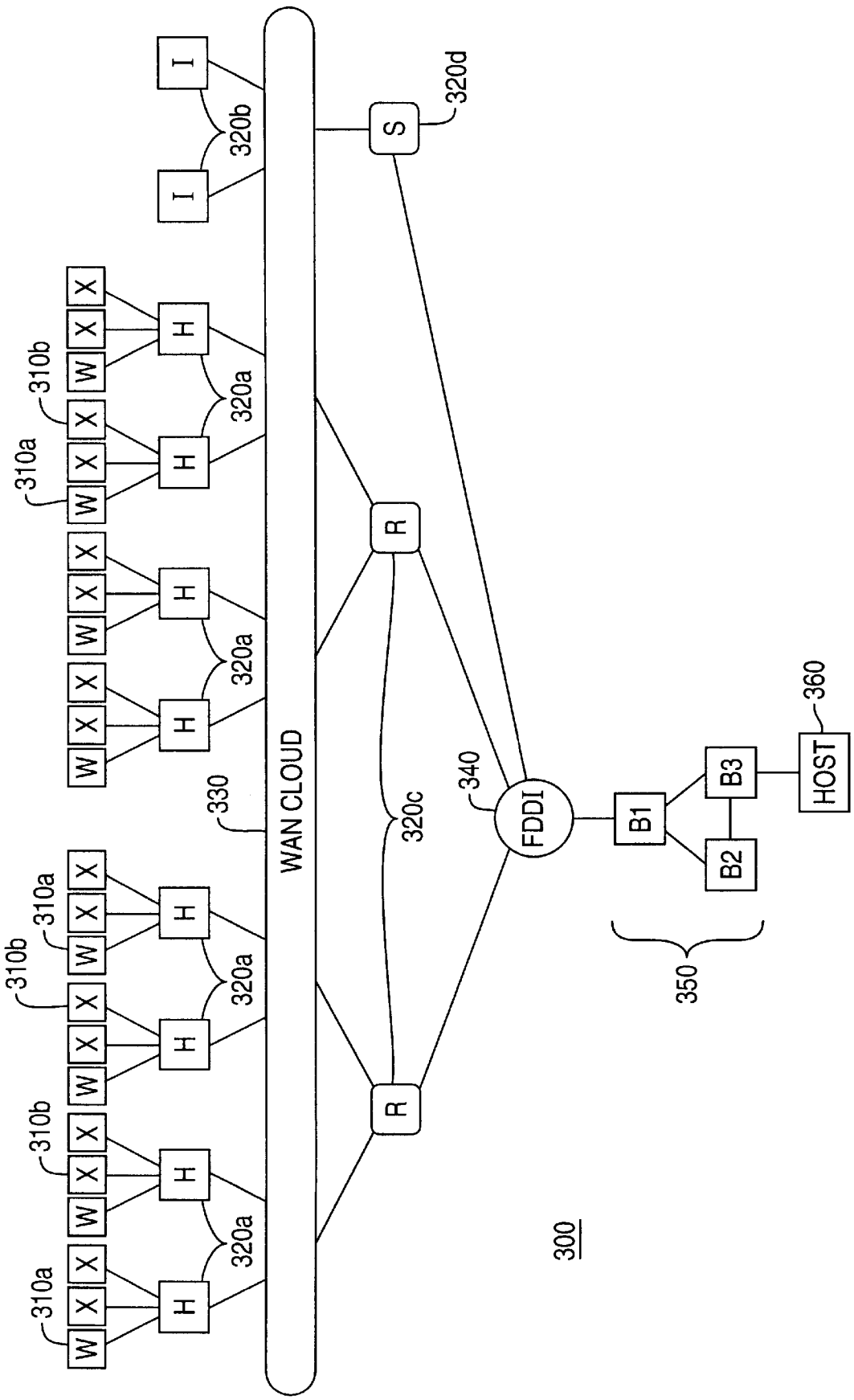
FIG. 3 illustrates a topological diagram of an exemplary network.

The principles of the present invention, which disclose systems and methods for generating and displaying a symbolic representation of a network model, may advantageously be described by applying an exemplary method to an exemplary network model. Referring initially to FIG. 3, there is illustrated a topological diagram of an exemplary network 300. Network 300, although illustrated as a computer network, may, in point of fact, be any conventional communications network, including wired and wireless systems. Network 300 includes a plurality of nodes (which can be work stations), a plurality of routers 320, a WAN 330, a FDDI 340, a backbone network 350 and a host node 360. Collectively, the foregoing, as well as gateways, links, bridges, portal devices, switches, LANs and the like, may suitably be referred to as "network elements." Network 300 represents a connectivity diagram of interconnected network elements.

Figure 4:
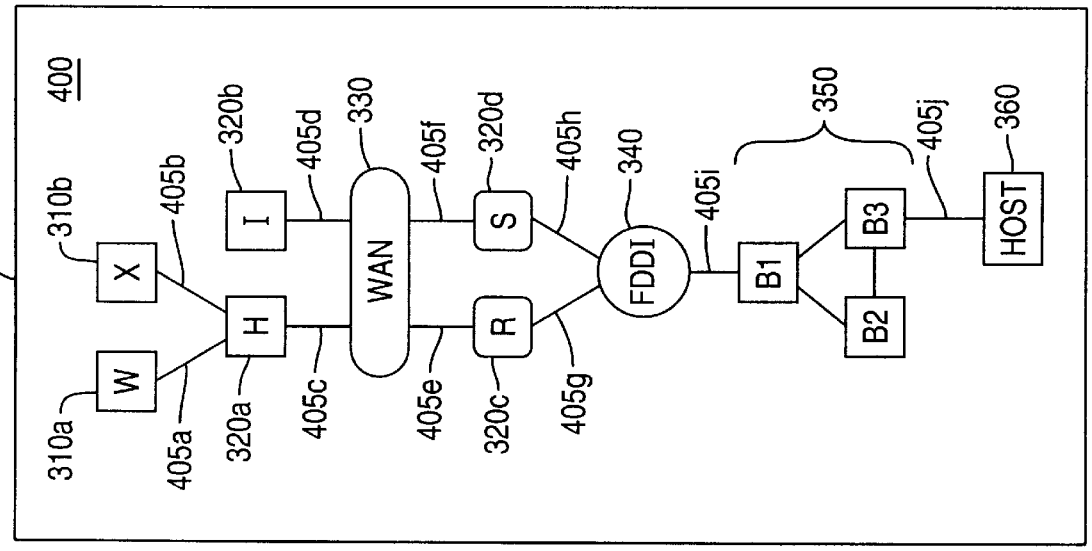
FIG. 4 illustrates an exemplary symbolic representation of the exemplary network of FIG. 3 in accordance with the principles of the present invention.

FIG. 4 illustrates an exemplary symbolic representation 400 of exemplary network 300 in accordance with the principles of the present invention. The symbolic representation 400 of exemplary network 300 may suitably be displayed in display area 150 of display device 110. The symbolic representation 400 includes select network elements of exemplary network 300. The illustrated embodiment is capable of presenting a symbolic representation 400 of associated ones, and groups, of interconnected network elements as a function of the underlying symmetries of exemplary network 300.

Figure 5:
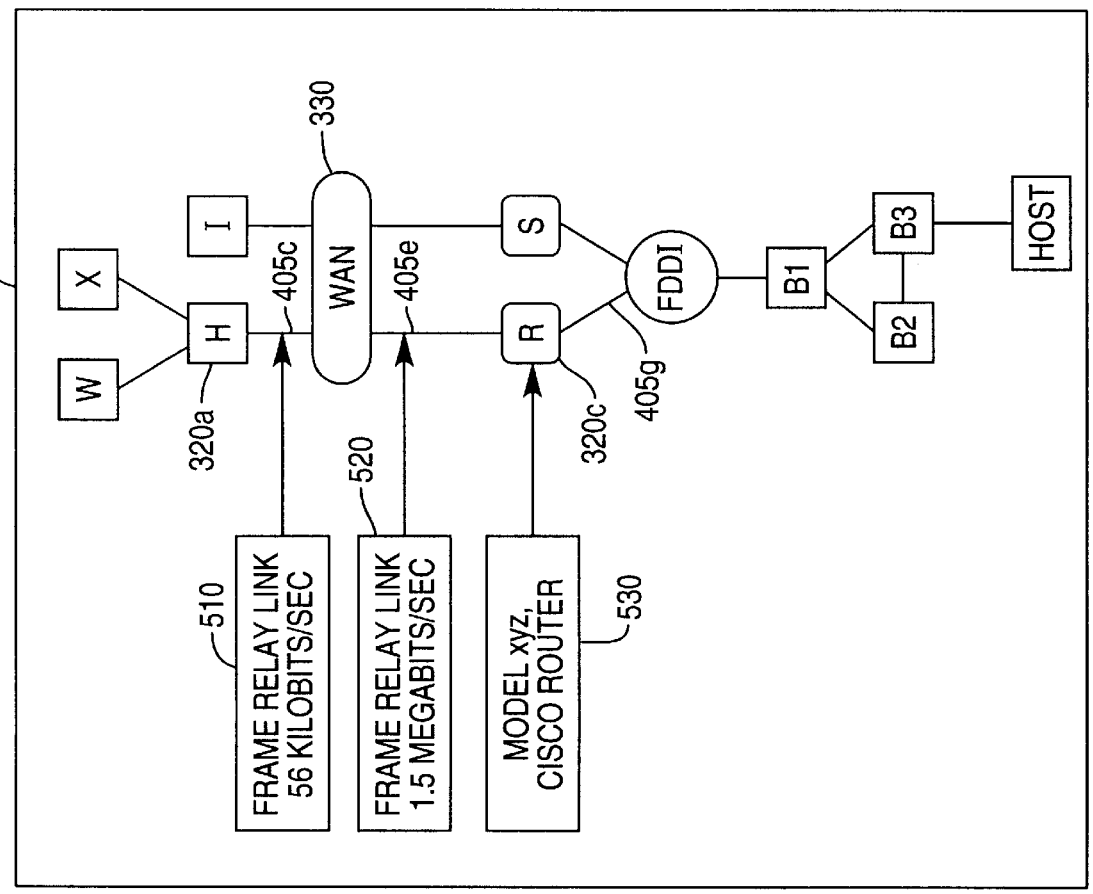
FIG. 5 illustrates an exemplary symbolic representation of the exemplary network of FIG. 3 further incorporating a plurality of exemplary characteristics of ones of the network elements within the same.

FIG. 5 illustrates an exemplary symbolic representation 400 of exemplary network 300, further incorporating a plurality of exemplary characteristics of ones of the network elements of network 300. The exemplary characteristics include a pair of frame relay link parameters 510, 520 that are associated with exemplary links 405c, 405e, respectively, and a router identification parameter 530 that is associated with exemplary router 320c. In accordance with the illustrated embodiment, a user, possibly using keyboard 115, may suitably interact with the modeling task to characterize or define attributes associated with ones of the network elements. The user may suitably associate one or more parameters with each of the network elements or, in alternate embodiments, selected ones of the network elements.

Figure 6:
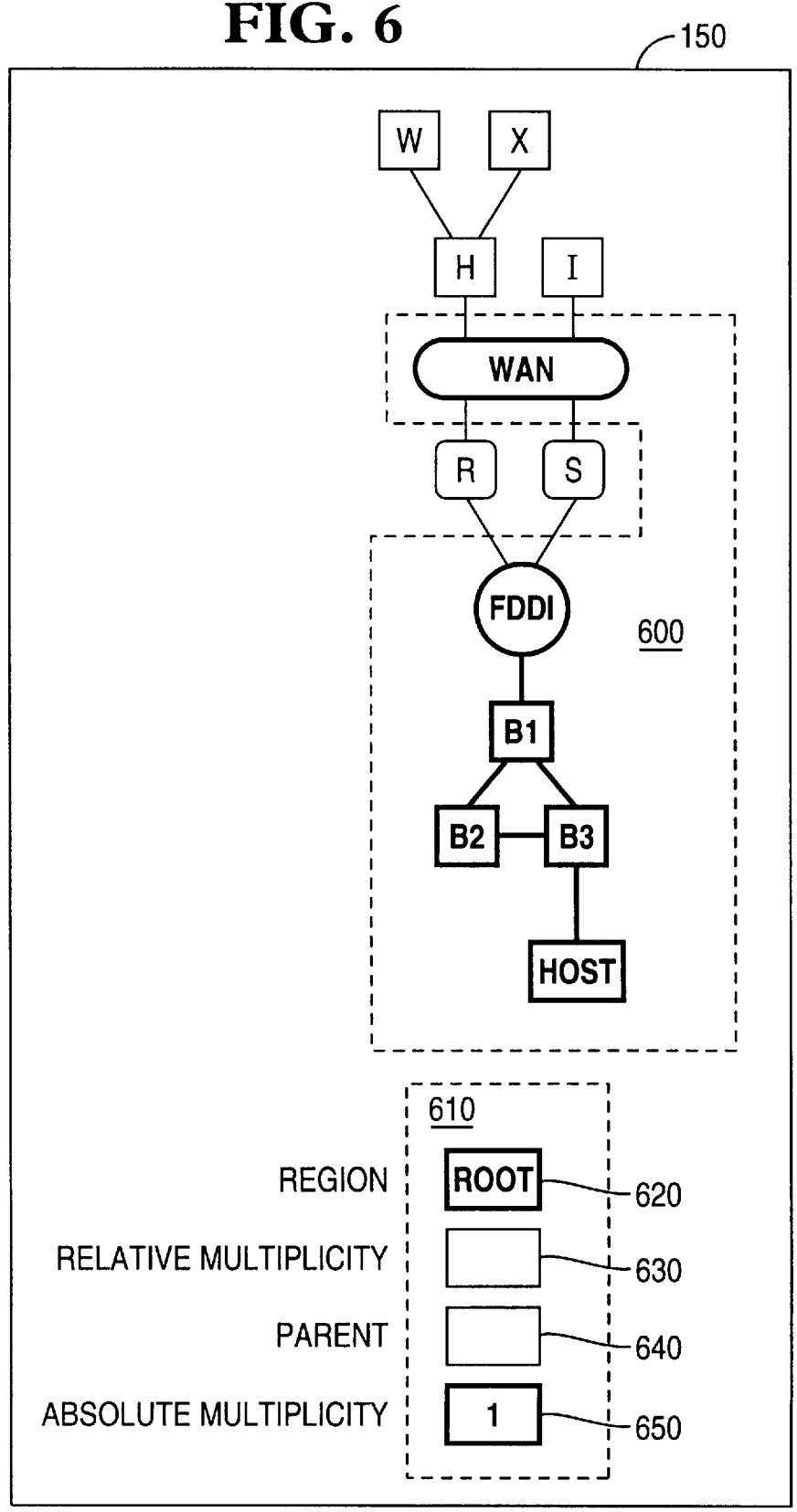
FIG. 6 illustrates an exemplary symbolic representation of the exemplary network of FIG. 3 further exhibiting an exemplary definition of a root region within the same.

FIG. 6 illustrates an exemplary symbolic representation 400 of exemplary network 300, exhibiting an exemplary definition of a root region 600. In accordance with the illustrated embodiment, a definition window 610 is suitably provided. Definition window 610 includes four exemplary fields, namely, a region field 620, a relative multiplicity field 630, a parent field 640 and an absolute multiplicity field 650. In the illustrative embodiment, the first three of the above-identified four fields are modifiable. The fourth field 640 is protected, and is determined by the network modeling task. It should be noted that when the illustrative phrase "root" is entered in region field 620, relative multiplicity field 630 and parent field 640 preferably become protected and are left blank, while absolute multiplicity field 650 is set to "1." The "root" definition, in accordance with the illustrative embodiment, means that every network element within the defined root region may appear once within exemplary symbolic representation 400, as well as exemplary network 300 of FIG. 3. It should be noted that network elements in the root region need not be directly coupled.

Figure 7:
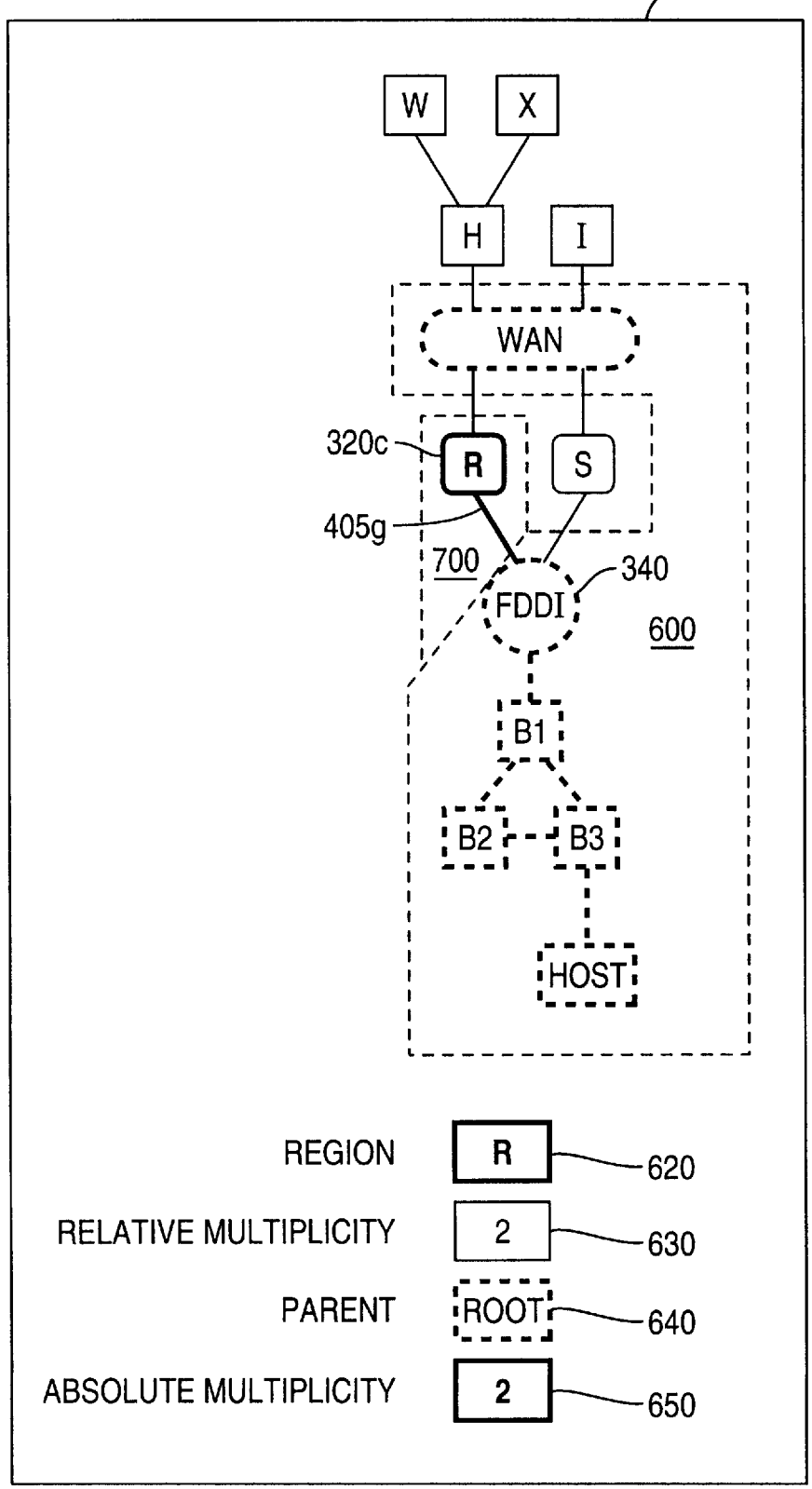
FIG. 7 illustrates an exemplary symbolic representation of the exemplary network of FIG. 3 further exhibiting an exemplary definition of a first region.

FIG. 7 illustrates an exemplary symbolic representation 400 of exemplary network 300 exhibiting an exemplary definition of a second region 700 (the first region in the illustrative embodiments is the root region). Region 700 includes a R router 320c and a suitable link 405g. Link 405g is operative to associate R router 320c with FDDI 340. In the illustrative embodiment, region 700 may suitably be highlighted within display area 150, possibly using select colors, for example. In accordance with the illustrative embodiment, the user defines region field 620 as "R," relative multiplicity field 630 as "2" and parent field 640 as "root."

Defining parent field 640 as the root preferably causes the network modeling task to highlight both root region 600 and region 700 in a visually distinguishing manner, such as by a combination of contrasting colors or visual indicators, for example. Defining relative multiplicity region 630 as "2" suitably indicates that there are two replicas of gateway region 700 per replica of root region 600 within network 300 of FIG. 3. "Replica," as the term is used herein, means copies, reproductions or the like. The network modeling task preferably completes absolute multiplicity field 650, which in the illustrative embodiment is "2." The value of absolute multiplicity region 650 is preferably used to describe the multiplicity of network elements comprising a particular region found in network 300. An important aspect of the present invention is that a full or complete network configuration schematic, such as that of FIG. 3, need not be displayed to the user.

FIGS. 8a through 8g illustrate further symbolic representations 400 of exemplary network 300, further exhibiting exemplary definitions of other regions. In accordance with the illustrative embodiment, the user continues defining new regions, and associating the same with region fields 620, relative multiplicity fields 630, parent fields 640 and absolute multiplicity fields 650. Each time a new region is defined, one end of each link, within the exemplary symbolic representation 400 of exemplary network 300, is associated with one of a new region or an ancestor region (i.e., a parent or ancestor region). The relative multiplicities 630 of these regions reflect the relative quantitative relationships of the network elements found in network 300, whereas the absolute multiplicities 650 of these regions reflect the absolute, or total, quantitative relationships of the network elements found in network 300. In accordance with the illustrated embodiment, the relationship between relative and absolute multiplicity may suitably be that the absolute multiplicity 650 of any region is equal to the relative multiplicity 630 of that region multiplied by the absolute multiplicity 650 of the region's parent region.

It should be noted that while on a display screen the symbolic representations of the regions (or fields) previously defined and the region currently being defined can be distinguished by a combination of contrasting colors and/or visual indicators, the embodiments illustrated in FIGS. 6–7 and 8A–8G use three different contrasting shades: (1) network elements depicted by regular lines, (2) network elements depicted by solid bold lines, and (3) network elements depicted by dotted bold lines. Specifically, in FIGS. 6–7 and 8A–8G, the network elements depicted by solid bold lines represent the region (or field) currently being defined; the network elements depicted by dotted bold lines represent the parent regions previously defined.

An important aspect of the illustrative embodiment shown in FIG. 6 is that the network elements comprising the root need not to be directly coupled. Another important aspect is that the use of multiplicity indicia, or indicators, such as relative multiplicity field 630 and absolute multiciplicy field 650 may suitably enable the user to define interconnections between network elements that are visually implied but not explicitly shown in FIG. 3 or FIG. 4. For example, FIG. 8B and FIG. 8D place link 405e in a parent region of the region containing link 405c. This serves to create a logical connection between links 405e and 405c, so that traffic may flow across the WAN between this pair of links, but not, for example, between 405e and 405d. In a similar fashion, FIG. 8C and FIG. 8E together create a logical connection between 405f and 405d.

FIG. 9A illustrates an exemplary symbolic representation 400 of exemplary network 300, further exhibiting an exemplary definition of attributes 900 associated with workstation node sessions 905a and 905b, and host node sessions 910a and 910b. An important aspect of the illustrated embodiment is that network elements may suitably be added to exemplary symbolic representation 400 of exemplary network 300 at any time.

FIG. 9B binds together 905a, 907a, 908a and 910a into an application session by placing them in a common region called "appl_A" in FIG. 9B. This is a further example of how regions can explicitly bind together what is visually suggested.

Figure 8A:
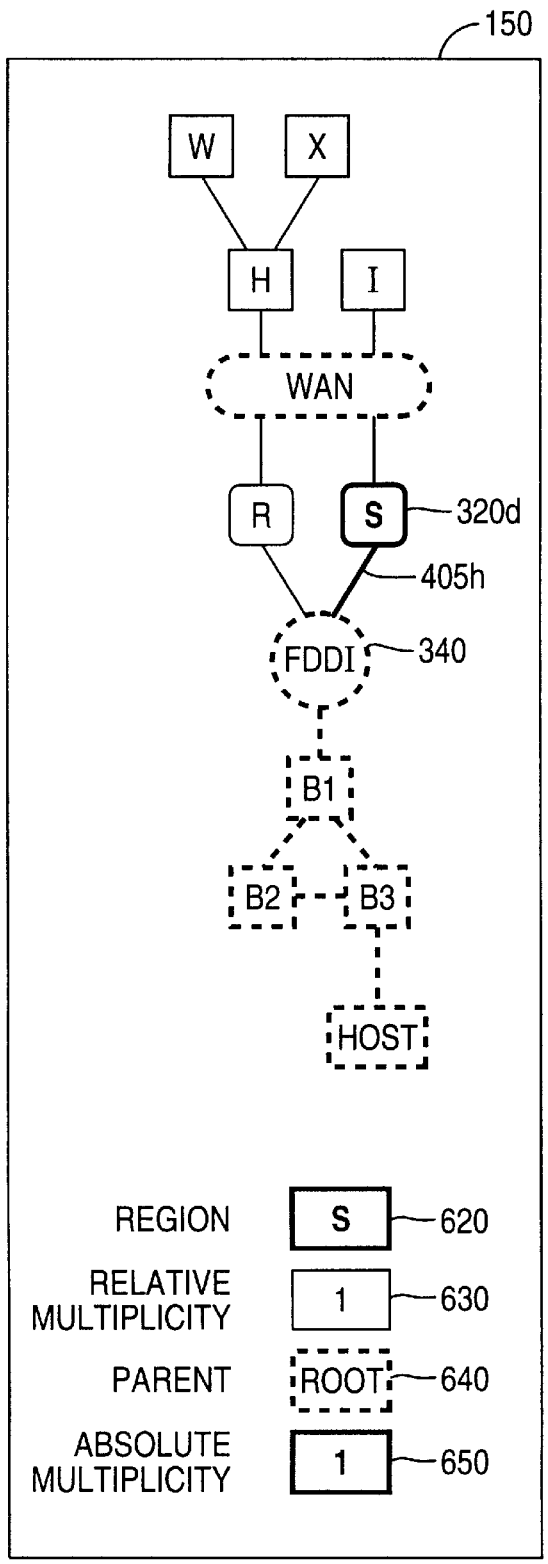
Figure 8B:
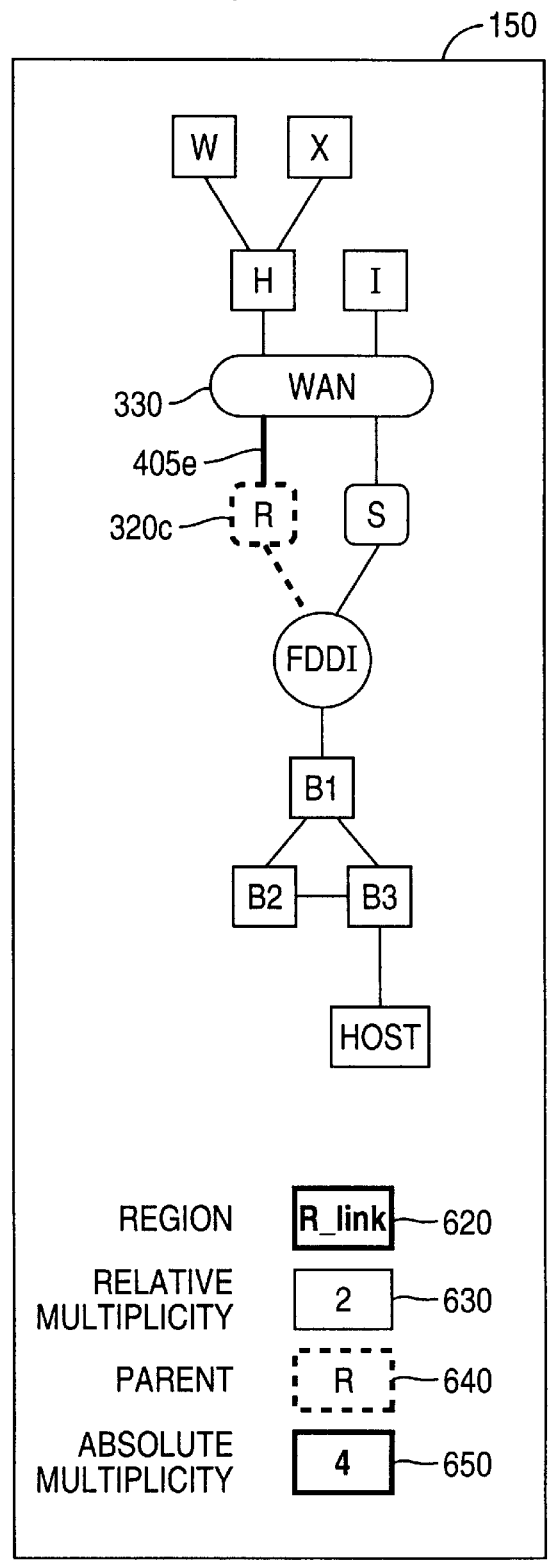
Figure 8C:
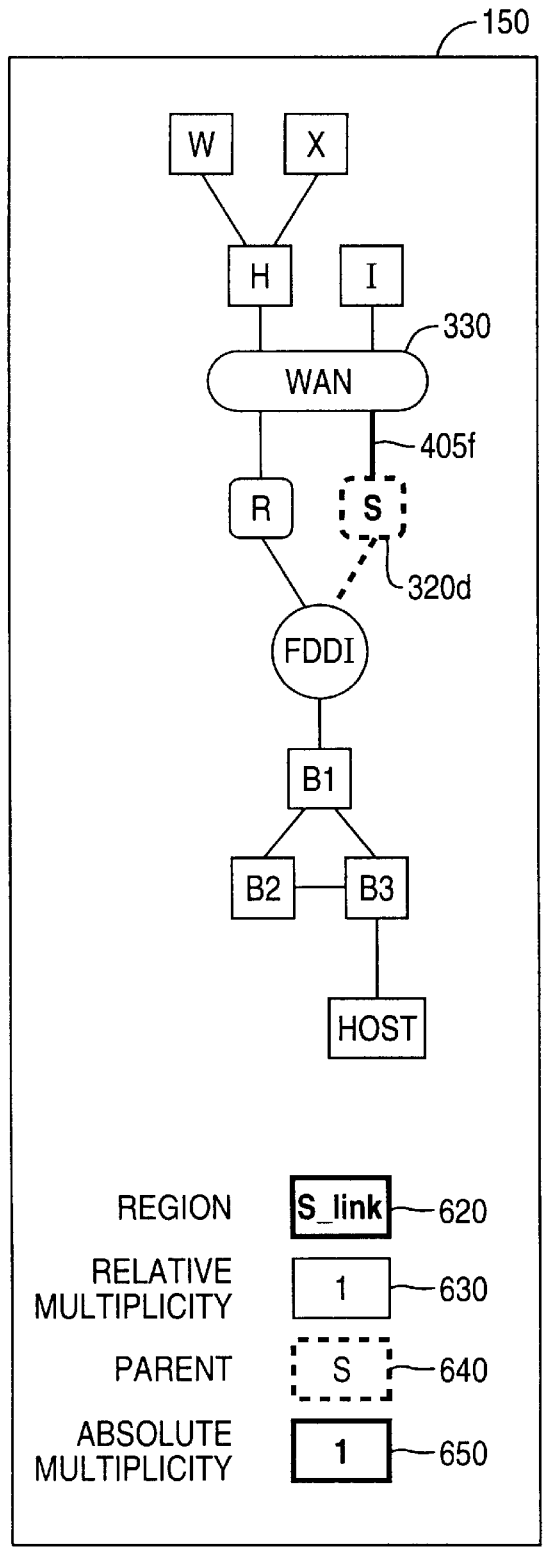
Figure 8D:
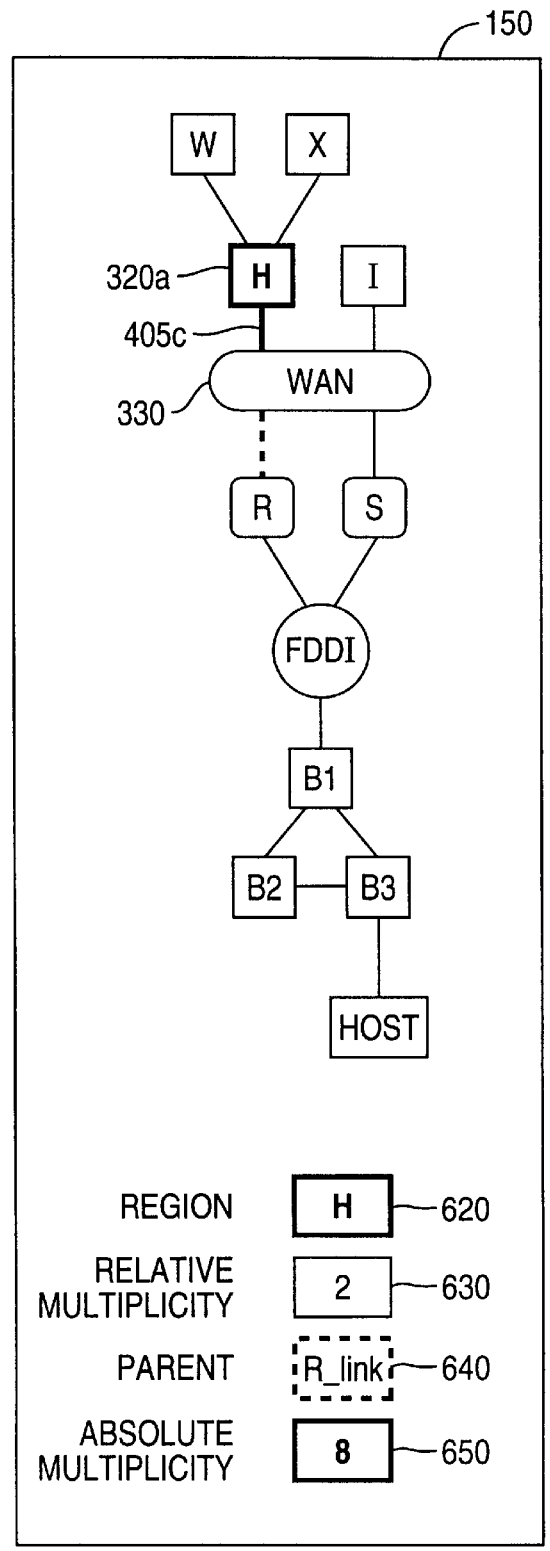
Figure 8E:
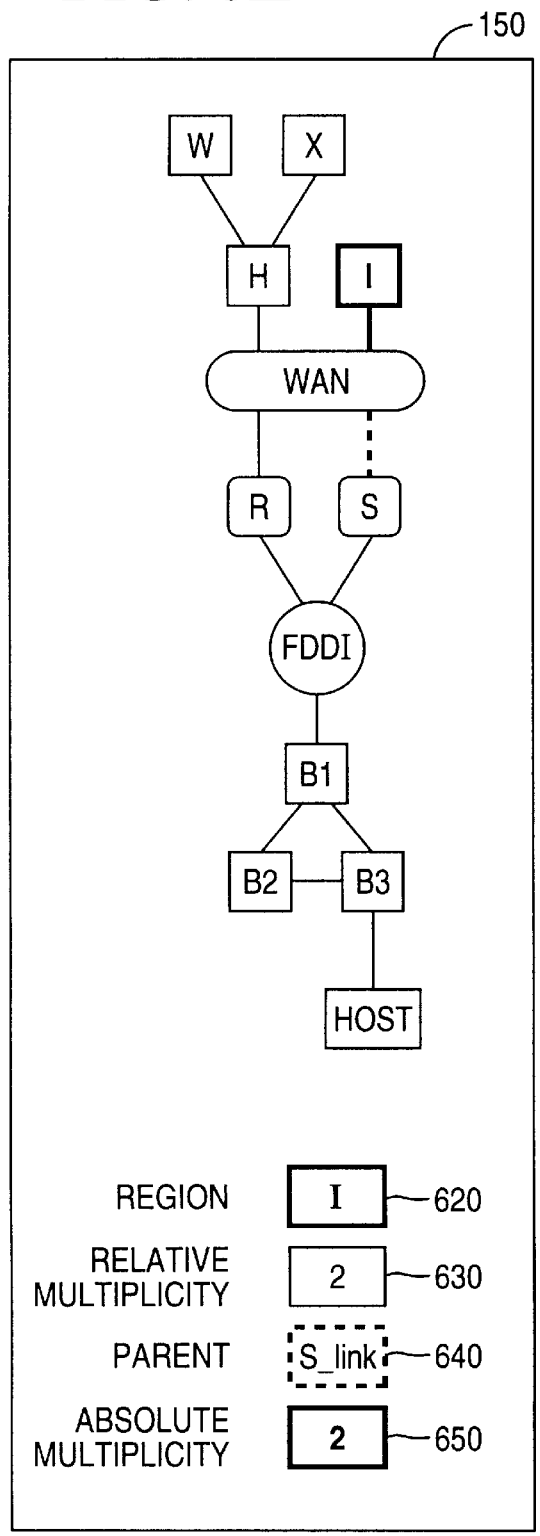
Figure 8F:
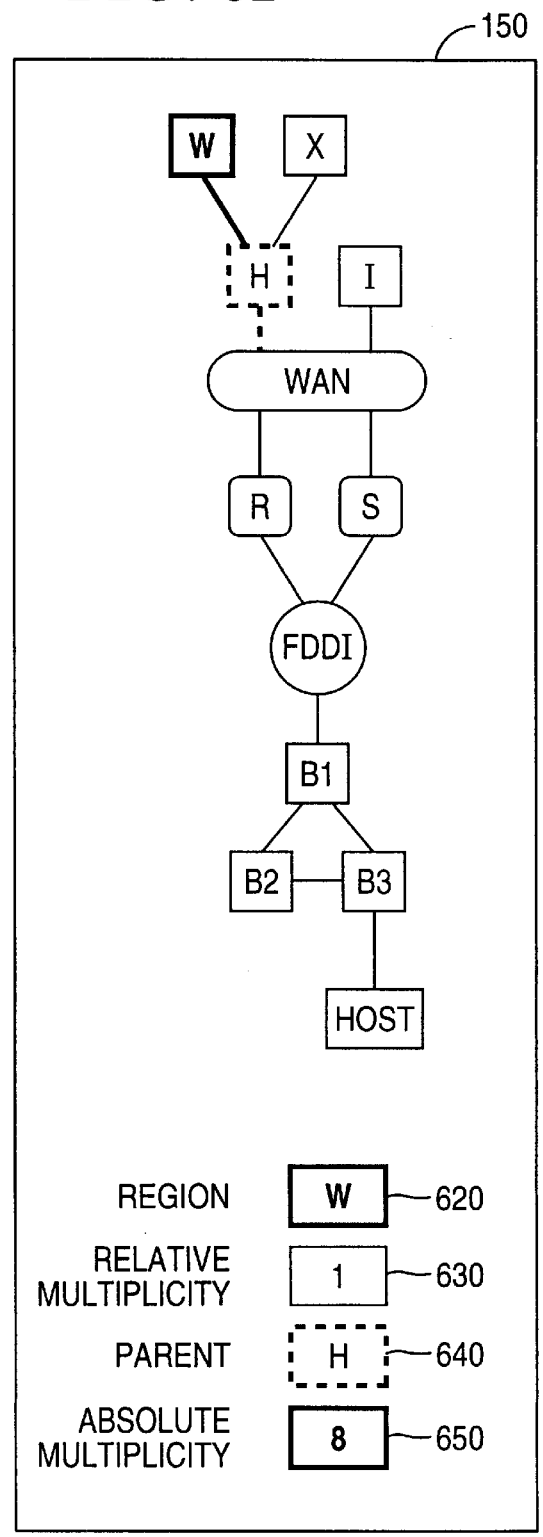

As the relative multiplicity 630 is 1, there is defined one such session for each work station region W (see FIG. 8F).

From FIG. 9A, we see that work station 905a will send in a 100 byte inquiry to application 910a, which will return a 3000 byte response. These transactions will occur at the rate of 5 per minute.

It is to be noted that elements in the "appl_A" region connect to the parent region W (connection 907a) and also to a distant ancestor region, namely the root (connection 908a). In general, it is always permitted that elements of a newly-defined region may connect to elements in the same region or to elements in any ancestor region.

FIG. 9C similarly creates another session. It shows that a work station may have more than one session associated with it.

Figure 10:
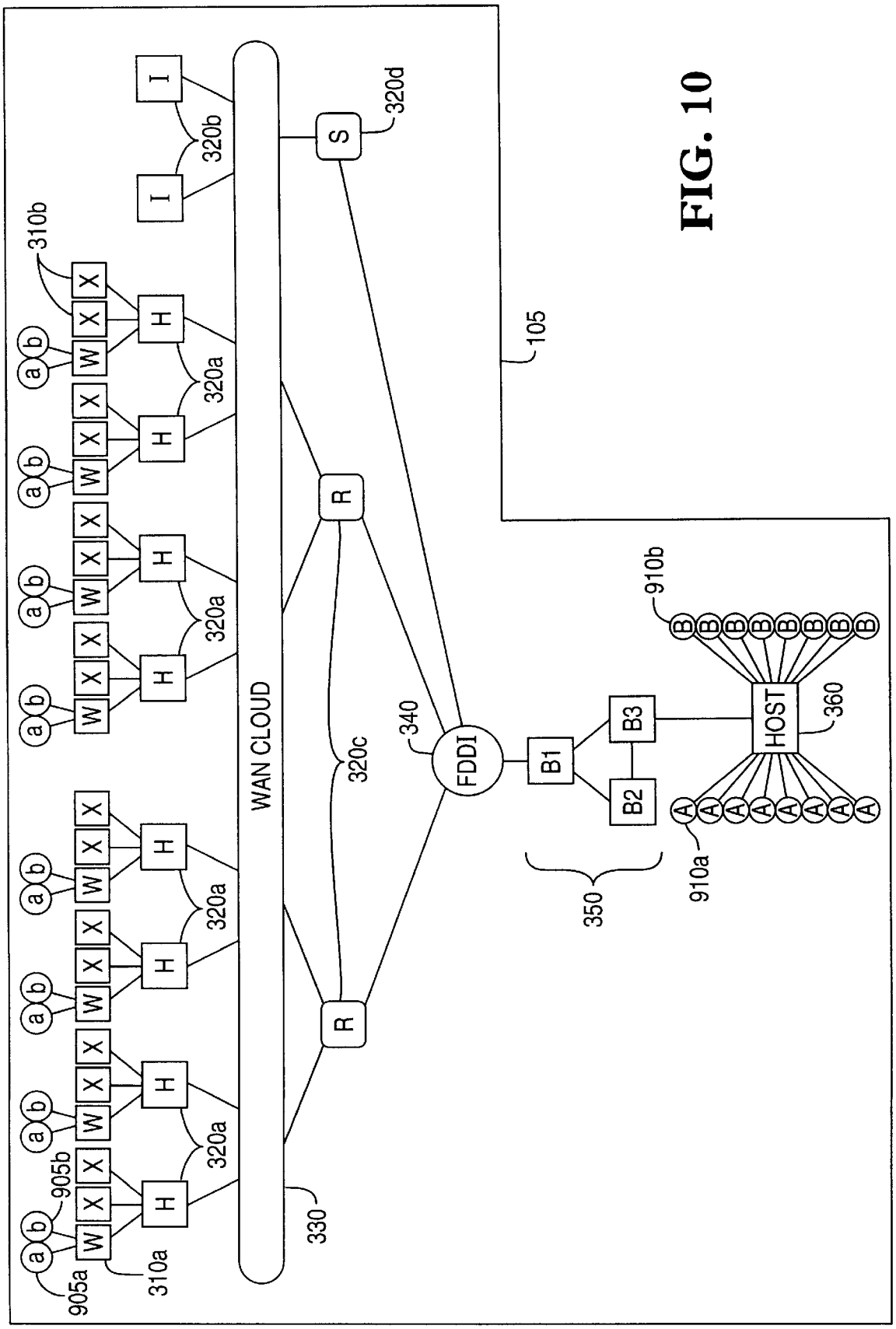
FIG. 10 illustrates a detailed diagram of the exemplary symbolic representation of FIG. 4, representing the network of FIG. 3 in the display area of FIG. 1.
Figure 11:
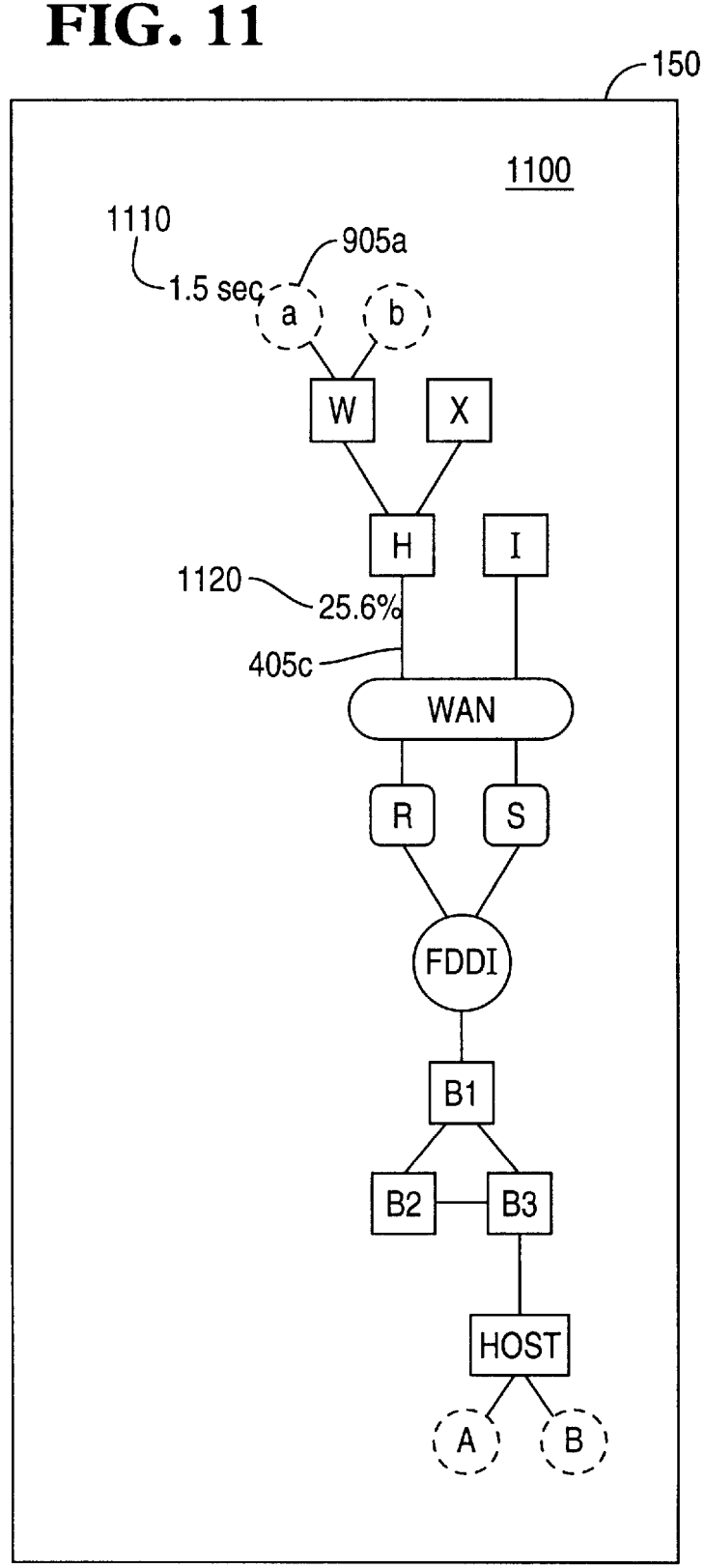
FIG. 11 illustrates an exemplary network model report in accordance with the present invention.

FIG. 10 illustrates a detailed diagram of symbolic representation 400 representing the complete exemplary network 300 in display area 150. In accordance with the illustrated embodiment, the set of associated data records representing the network 300 may suitably be processed using at least one of a mathematical network model or a simulation network model. This may be accomplished using a suitably programmed processing system 100. As a result of such processing, a network model report may be generated. Turning to FIG. 11, there is illustrated an exemplary network model report 1100 in accordance with the present invention. Model report 1100, although presented as a graphical report in display area 150, may suitably be generated in hard paper copy or other conventional media. In accordance with an aspect of the illustrated embodiment, a first exemplary value 1110 of "1.5 sec," the average response time for all workstation node sessions, is displayed in display area 150. In accordance with another aspect of the illustrated embodiment, a second exemplary value 1120 of "25.6%," the average utilization of links 405c, is displayed in display area 150. These exemplary average values of response times and utilizations are preferably determined as a function of and in response to, the symmetries of ones of the regions and the network elements as well as the locations of the same within network 300. These symmetrical regions and network elements process and transmit identical traffic through identical paths.

Figure 12:
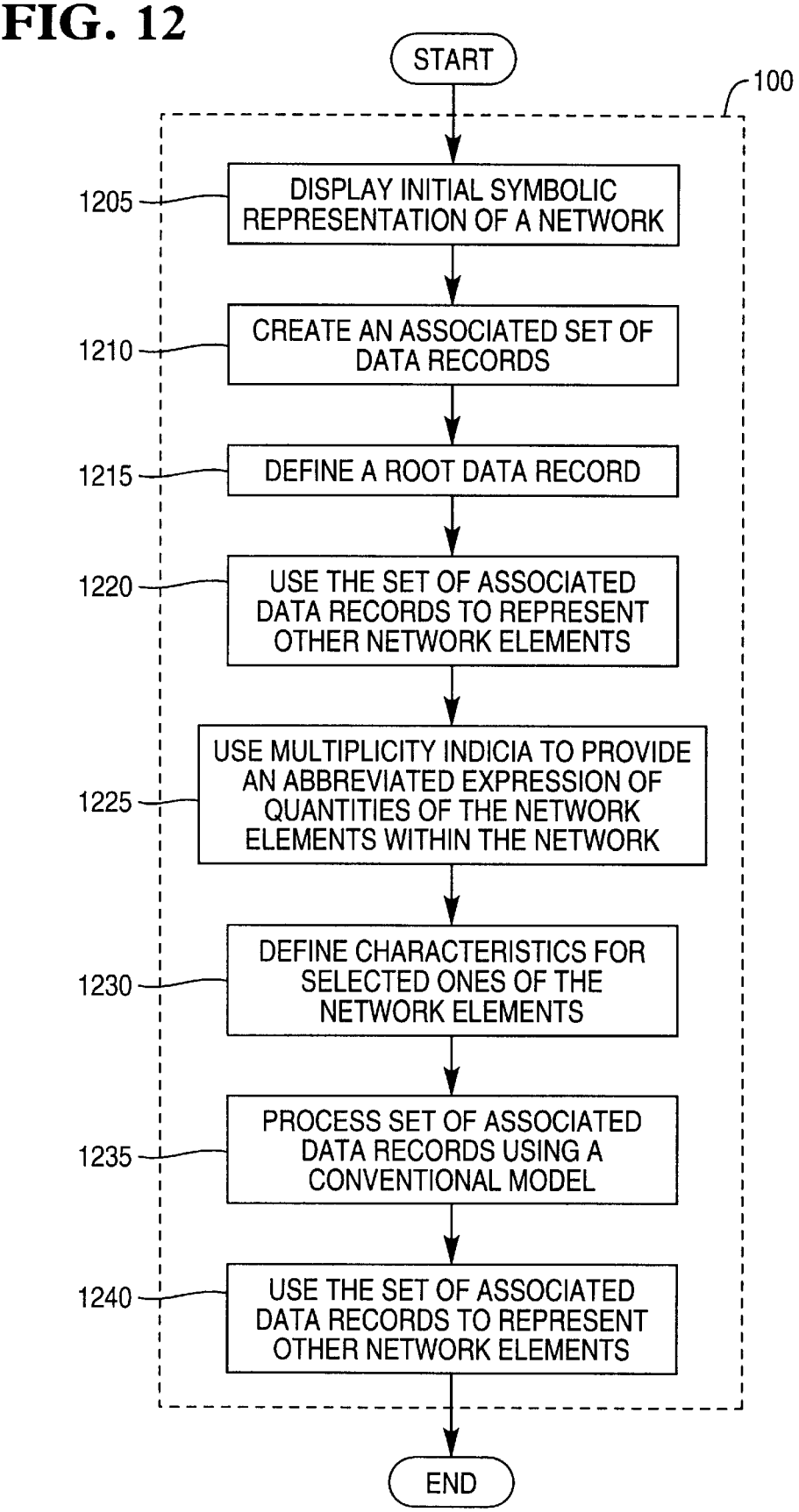
FIG. 12 illustrates a flow diagram of an exemplary method for generating and displaying the symbolic representation of the network model of FIG. 4.

FIG. 12 illustrates a flow diagram of an exemplary method for generating and displaying the symbolic representation of the network model of FIG. 4. For illustrative purposes only, the discussion of FIG. 12 is made with reference to FIGS. 1 through 4. In an exemplary embodiment, a user interacts with processing system 100, possibly using keyboard 115 or some other conventional interface, to access display area 150 and to display an initial symbolic representation 400 of network 300 (input/output step 1205). The user creates, or defines, a set of associated data records (process step 1210). The set of associated data records are preferably stored in a memory, such as detached local memory 140 or hard disk drive 120, for example, and are representative of network elements within network 300.

The user creates, or defines, a root data record (process step 1215). The root data record represents a root node within network 300. Creation of the root data record, in accordance with the illustrative embodiment, means that every network element within the defined root region may appear once within symbolic representation 400, as well as exemplary network 300.

The user interactively defines the other network elements and selectively associates the same with other network elements (process step 1220). The associated data records include multiplicity indicia which is used to provide an abbreviated expression of quantities of the network elements within network 300 (process step 1225). The multiplicity indicia is used to simplify the displaying of symbolic representation 400 of network 300 on display device 110. The user may suitably modify ones of the associated data records to include at least one of a set of network element characteristics (e.g., element identification, element placement with network, capacity, queue size, etc.) or a set of network characteristics (e.g., LAN/WAN, protocols, standards, etc.) (process step 1230).

The user may suitably use the set of associated data records in conjunction with at least one of a conventional mathematical network model and a conventional simulation network model (process step 1235). Preferred systems and methods for modeling network 300 are more fully disclosed in U.S. patent application Ser. No. 08/656,122, entitled "SYSTEMS AND METHODS FOR MODELING A NETWORK," which was incorporated by reference hereinabove. Upon completion of the modeling task, a network model performance report may be generated with respect to particular network elements, regions within network 300 or network 300 as a whole (process step 1240). The network model performance report is preferably generated as a function of the set of associated data records.

Although the illustrative embodiments described above are for networks that have the appearance of a "tree" (except for the root region), the principles of the present invention apply to the networks in which any region may have arbitrary connections within it.

Figure 13:
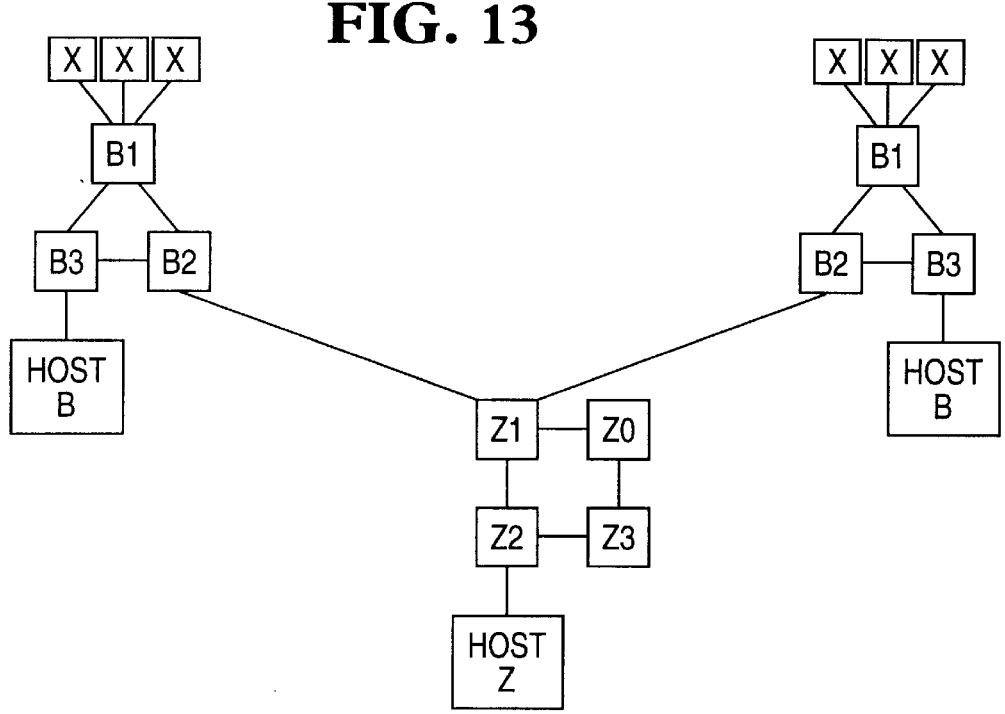
FIG. 13 illustrates a topological diagram of an alternate exemplary network.
Figure 14:
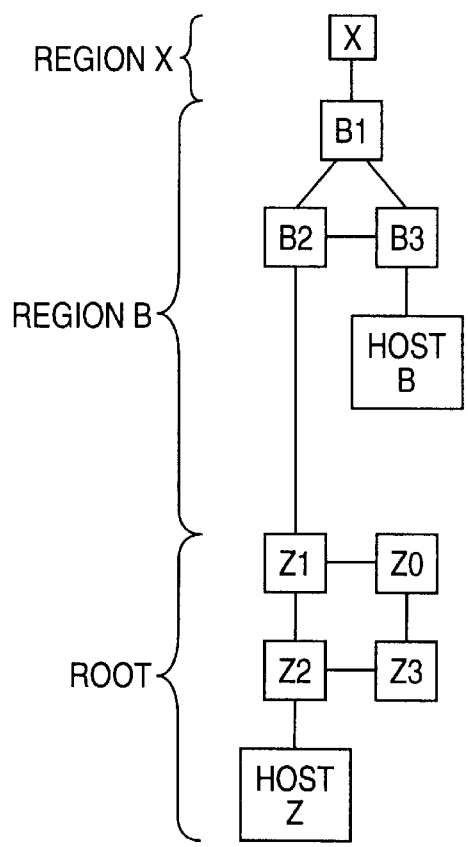
FIG. 14 illustrates an exemplary symbolic representation of the exemplary network in FIG. 13 in accordance with the principles of the present invention.

FIGS. 13 and 14 illustrate such a network. As shown therein, FIG. 14 contains the symbolic representation of the network of FIG. 13, and shows its regions in an abbreviated format. There are three regions, shown as the root, region B, and region X. The region B can have multiplicity 2 with respect to the root, which is its parent region. The region X can have multiplicity 3 with respect to its parent region, which is region B. This example illustrates that a region other than the root, namely region B, may have arbitrary connections to it. B could also contain a subnetwork such as a LAN.

As discussed in the above, the network elements of FIG. 6 are not directly coupled. The same can be true in arbitrary regions of a network, although for simplicity FIG. 13 and FIG. 14 do not explicitly illustrate this.

Application sessions could be defined to flow between work stations X and HOST B (as well as between X and HOST Z), pointing out that neither end of a session needs to be associated with the root.

From the foregoing, it is apparent that the present invention provides systems and methods for generating and displaying a symbolic representation of a network model. In a preferred embodiment of the same, a GUI environment is provided to enable a user to simplify the generation and advantageously display of a symbolic representation of a network model on a display device. Although the present invention and its advantages have been described in detail, those skilled in the art should understand that they can make various changes, substitutions and alterations herein without departing from the spirit and scope of the invention in its broadest form.

What is claimed is:

1. A processing system including a memory for storing tasks and a processing circuit, associated with said memory, for executing ones of said tasks, said processing system comprising:

a display device, associated with said processing circuit, operative to provide a display area accessible to executed ones of said plurality of tasks, said display area capable of displaying a symbolic representation of a network model; and a network modeling task storable in said memory and executable by said processing circuit to create a set of associated data records representing network elements within said network model, said associated data records including multiplicity indicia for providing an abbreviated expression of quantities of said network elements within said network model, said multiplicity indicia simplifying said displaying of said symbolic representation of said network model on said display device.

2. The processing system as set forth in claim 1 wherein said network modeling task directs said processing circuit to access said display area and to display said network model therein.

3. The processing system as set forth in claim 2 wherein said network modeling task further directs said processing circuit to display said multiplicity indicia.

4. The processing system as set forth in claim 1 further including a user interface, said user interface associated with said processing circuit.

5. The processing system as set forth in claim 4 wherein said network modeling task further directs said processing circuit to modify said set of associated data records in response to signals received from said user interface.

6. The processing system as set forth in claim 1 wherein ones of said associated data records include at least one of a set of network element characteristics and a set of network characteristics.

7. The processing system as set forth in claim 1 wherein said network modeling task further directs said processing circuit to create a root data record, said root data record representing one of a root network element and a root network region within said network connectivity model.

8. The processing system as set forth in claim 1 wherein said network modeling task further directs said processing circuit to process said set of associated data records using at least one of a mathematical network model and a simulation network model.

9. The processing system as set forth in claim 8 wherein said network modeling task further directs said processing circuit to generate a network model report.

10. A method for displaying a symbolic representation of a network model, said method comprising the steps of:

providing a display area on a display device, said display area capable of displaying said symbolic representation of said network model; and creating a set of associated data records representing network elements within said network model, said associated data records including multiplicity indicia for providing an abbreviated expression of quantities of said network elements within said network model, said multiplicity indicia simplifying said displaying of said symbolic representation of said network model on said display device.

11. The method as set forth in claim 10 further comprising the step of displaying said network model in said display area.

12. The method as set forth in claim 11 further comprising the step of displaying said multiplicity indicia in said display area.

13. The method as set forth in claim 10 further comprising the step of receiving a modification signal and, in response thereto, modifying said set of associated data records.

14. The method as set forth in claim 10 further comprising the step of creating a root data record, said root data record representing one of a root network element and a root region within said network model.

15. The method as set forth in claim 10 further comprising the step of processing said set of associated data records using at least one of a mathematical network model and a simulation network model.

16. The method as set forth in claim 15 further comprising the step of generating a network model report.

17. A method for representing a network model in a memory, said method comprising the steps of:

receiving a set of characteristics associated with network elements within said network model, said set of characteristics including multiplicity indicia for providing an abbreviated expression of quantities of said network elements within said network model; and creating a set of associated data records in said memory using said multiplicity indicia, said set of associated data records representing said network elements and incorporating said set of characteristics, said multiplicity indicia simplifying said representation of said network model in said memory.

18. The method set forth in claim 17 further comprising the step of receiving a user input for modifying said set of associated data records.

19. The method as set forth in claim 17 further comprising the step of associating with said associated data records a network element indicator and a characteristic indicator, said network element indicator identifying each of said network elements as one of a node, a router, a gateway, a link, a bridge, and a switch, and said characteristic indicator including at least one of a set of network element characteristics and a set of network characteristics.

20. The method as set forth in claim 17 further comprising the step of creating a root data record representing one of a root network element and a root region within said network model.

21. The method as set forth in claim 17 further comprising the step of processing said set of associated data records using at least one of a mathematical network model and a simulation network model.

22. The method as set forth in claim 21 further comprising the step of generating a network model report.

* * * * *